United States Patent
Dolmaya et al.

(10) Patent No.: US 11,702,057 B2
(45) Date of Patent: Jul. 18, 2023

(54) MODULAR HYDRAULIC CONTROL HOUSING

(71) Applicant: Continental Teves AG & Co. oHG, Frankfurt am Main (DE)

(72) Inventors: Joseph Dolmaya, Frankfurt am Main (DE); Mike Hirsemann, Frankfurt am Main (DE); Peter Hoffmann, Frankfurt am Main (DE); Rüdiger Briesewitz, Frankfurt am Main (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 94 days.

(21) Appl. No.: 17/259,274

(22) PCT Filed: Jun. 27, 2019

(86) PCT No.: PCT/EP2019/067171
§ 371 (c)(1),
(2) Date: Jan. 11, 2021

(87) PCT Pub. No.: WO2020/015548
PCT Pub. Date: Jan. 16, 2020

(65) Prior Publication Data
US 2021/0253077 A1    Aug. 19, 2021

(30) Foreign Application Priority Data
Jul. 11, 2018   (DE) .................... 10 2018 211 518.4

(51) Int. Cl.
*B60T 15/50*           (2006.01)
(52) U.S. Cl.
CPC .................................. *B60T 15/50* (2013.01)

(58) Field of Classification Search
CPC ........ B60T 15/50; B60T 15/54; B60T 13/148; B60Y 2400/81; F16K 27/0209; F16K 31/12; F15B 1/027
(Continued)

(56) References Cited

U.S. PATENT DOCUMENTS 892,123 A * 6/1908 Bleoo .................... B60T 15/54
                                                 303/77
1,233,427 A * 7/1917 Webster ................ B60T 15/54
                                                 303/70
(Continued)

FOREIGN PATENT DOCUMENTS

CN       101128692 A       2/2008
CN       104350318 A       2/2015
(Continued)

OTHER PUBLICATIONS

German Search Report for German Application No. 10 2018 211 518.4, dated Apr. 15, 2019 with partial translation, 10 pages.
(Continued)

*Primary Examiner* — Nicholas J Lane
*Assistant Examiner* — San M Aung
(74) *Attorney, Agent, or Firm* — RatnerPrestia

(57) ABSTRACT

A hydraulic control housing of modular construction consists of a first block, in which a compression chamber is formed, and a second block, which has a port to a reservoir. The compression chamber is connected to the reservoir via a duct extending through the control housing. A check valve is arranged in that duct section of the duct which extends through the first block.

6 Claims, 2 Drawing Sheets

(58) Field of Classification Search
USPC .......................................................... 303/70
See application file for complete search history.

(56) References Cited

U.S. PATENT DOCUMENTS

| | | | |
|---|---|---|---|
| 3,886,848 A | 6/1975 | Budecker | |
| 4,678,241 A * | 7/1987 | Tamamori | B60T 15/50 |
| | | | 303/33 |
| 6,105,609 A * | 8/2000 | Polidan | F16K 15/141 |
| | | | 137/550 |
| 6,244,295 B1 * | 6/2001 | Bartussek | F16K 15/044 |
| | | | 137/540 |
| 9,810,337 B2 | 11/2017 | Schneider et al. | |
| 9,909,675 B2 | 3/2018 | Grebe et al. | |
| 10,077,851 B2 | 9/2018 | Simonsen | |
| 10,228,709 B2 | 3/2019 | Bruck et al. | |
| 10,533,674 B2 | 1/2020 | Sierakowski-Larsen | |

FOREIGN PATENT DOCUMENTS

| | | | | |
|---|---|---|---|---|
| CN | 105190134 A | 12/2015 | | |
| CN | 205025862 U | 2/2016 | | |
| CN | 205678213 U | 11/2016 | | |
| CN | 107013715 A | 8/2017 | | |
| DE | 1147856 B | 4/1963 | | |
| DE | 2449443 A1 | 4/1976 | | |
| DE | 3829724 A1 | 3/1990 | | |
| DE | 10035391 A1 | 3/2001 | | |
| DE | 10063277 A1 | 6/2002 | | |
| DE | 102015215241 A1 | 2/2017 | | |
| EP | 1847720 A1 * | 10/2007 | ............ | F15B 11/044 |
| FR | 2228998 A1 | 12/1974 | | |
| GB | 2109132 A * | 5/1983 | ............ | B60T 13/148 |
| JP | 08320077 A | 12/1996 | | |
| JP | 2015021524 A | 2/2015 | | |
| KR | 1020130137748 A | 12/2013 | | |
| KR | 1020170116028 A | 10/2017 | | |
| SU | 742205 A1 | 6/1980 | | |

OTHER PUBLICATIONS

International Search Report and Written Opinion for International Application No. PCT/EP2019/067171, dated Oct. 30, 2019, with partial translation, 8 pages.
International Search Report and Written Opinion for international Application No. PCT/EP2019/067171, dated Oct. 30, 2019, 14 pages (German).
English Translation of the Written Opinion for International Application No. PCT/EP2019/067171, dated Oct. 30, 2019, 7 pages.
Chinese Office Action for Chinese Application No. 201980045416.6, dated Jan. 30, 2023 with translation, 3 pages.
Chinese Office Action for Chinese Application No. 201980045416.6, dated Aug. 1, 2022, with translation, 14 pages.
Korean Decision for Grant of Patent for Korean Application No. 10-2021-7000122, dated Nov. 3, 2022 with translation, 4 pages.

* cited by examiner

MODULAR HYDRAULIC CONTROL HOUSING

CROSS REFERENCE TO RELATED APPLICATIONS

This application is the U.S. National Phase Application of PCT International Application No. PCT/EP2019/067171, filed Jun. 27, 2019, which claims priority to German Patent Application No. 10 2018 211 518.4, filed Jul. 11, 2018, the contents of such applications being incorporated by reference herein.

FIELD OF THE INVENTION

The invention relates to a hydraulic control housing of modular construction, having at least one first block, which has a first boundary surface and in which a compression chamber is formed, and one second block, which has a second boundary surface and has a port to a reservoir, wherein the blocks abut with their boundary surfaces against one another, and the compression chamber is connected to the port via a duct which crosses the boundary surfaces, wherein the duct has a first duct section, which extends in the first block, and a second duct section, which extends in the second block, and having a check valve in the duct, which check valve opens in the direction of the compression chamber.

BACKGROUND OF THE INVENTION

In the prior art embodiments, the check valve is arranged within the second block.

SUMMARY OF THE INVENTION

The invention is based on simplifying the design. To solve the problem, an aspect of the invention provides that the check valve is arranged in the first duct section.

It is furthermore provided that the first block has a first outer surface into which a blind bore opens, wherein the outer surface extends parallel to the boundary surface of the first block, wherein the check valve is inserted into the blind bore in the form of a cartridge, and wherein the block has a second outer surface in which the port to the reservoir is situated.

In this embodiment, the first duct section is made up of a port duct and a bottom duct, wherein the port duct extends from a lateral surface of the blind bore to the port, and the bottom duct extends from the bottom of the blind bore into the boundary surface of the first block.

An alternative embodiment is one in which the port is formed in a blind bore in which a cartridge with a check valve is inserted, wherein said cartridge is held against a step in the blind bore by a ring plug, which is suitable for receiving a pin of the reservoir.

The check valve is preferably a plate valve which has a valve ring having a valve passage, the underside of which valve ring is directed toward the bottom of the blind bore, wherein a valve plate is situated in front of the underside and abuts sealingly against the underside.

Furthermore, the valve plate has a valve plunger which extends through the valve passage to the rear side of the valve ring, wherein a cylindrical spring is supported against said rear side and abuts against a collar connected to the plunger.

A filter ring is situated on the rear side of the valve ring and is held either by a closure cover (first embodiment) or by the ring plug (second embodiment).

BRIEF DESCRIPTION OF THE DRAWINGS

An aspect of the invention will be explained in more detail below on the basis of an exemplary embodiment. In the figures.

DETAILED DESCRIPTION OF THE INVENTION

Figure 1:
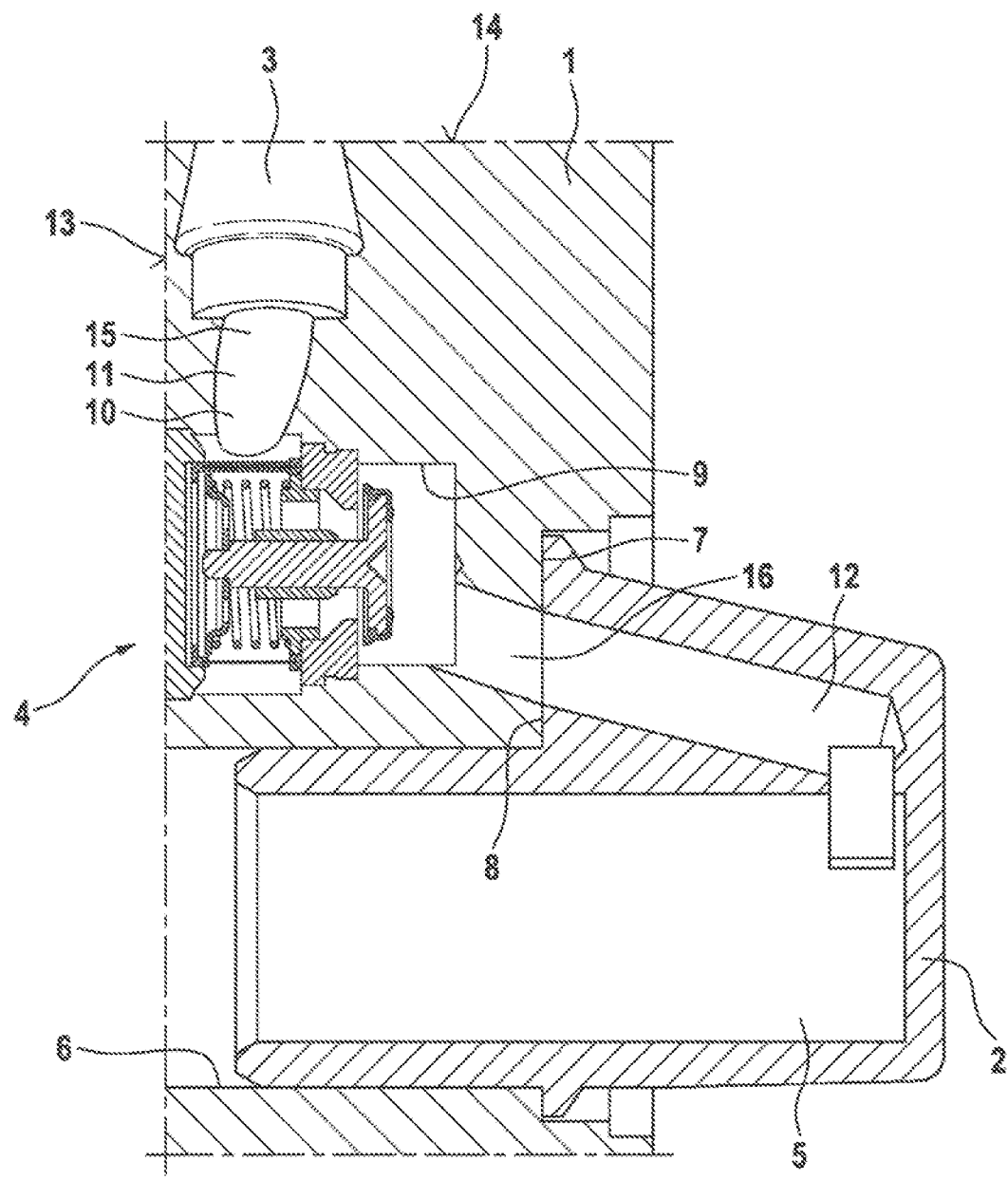
FIG. 1 shows a cross-sectional illustration of a first embodiment of the invention.

Firstly, reference is made to FIG. 1. This shows a detail from a control housing which, in addition to the elements illustrated here, which are to be described in more detail further below, also contains further valves and pumps or brake pressure generators.

The control housing is assembled at least from a first block 1 and a second block 2. The first block 1 has a port 3 to a reservoir of the brake system. A check valve 4 is furthermore situated in said first block. The second block 2 accommodates substantially a compression chamber 5 which is inserted into a bore 6 in the first block 1.

The second block 2 has a collar with a boundary surface 7 which abuts against a boundary surface 8 of the first block 1 when the second block 2 is inserted into the bore 6 of the first block 1.

The port 3 is connected to the compression chamber 5 via a duct 10, which consists of a first duct section 11 in the first block 1 and a second duct section 12 in the collar of the second block 2. The two sections meet at the boundary surfaces 7, 8, so that the duct 10 is continuous.

The check valve is situated in the first duct section 11 within the first block 1. For this purpose, according to the embodiment as per FIG. 1, a blind bore 9 is provided in a first outer surface 13 of the block 1, which outer surface extends parallel to the boundary surface 8 of said block.

The check valve 4 is formed by a cartridge, which is inserted into said blind bore 9. The valve 4 itself is described in more detail further below.

The port 3 is situated in a second outer surface 14 of the block 1, which extends perpendicularly to the first outer surface 13.

The first duct section 11 consists of a port bore 15, which leads from the port 3 into the lateral surface of the blind bore 9, and a bottom duct 16, which departs from the bottom of the blind bore 9 and opens into the boundary surface 8.

Figure 2:
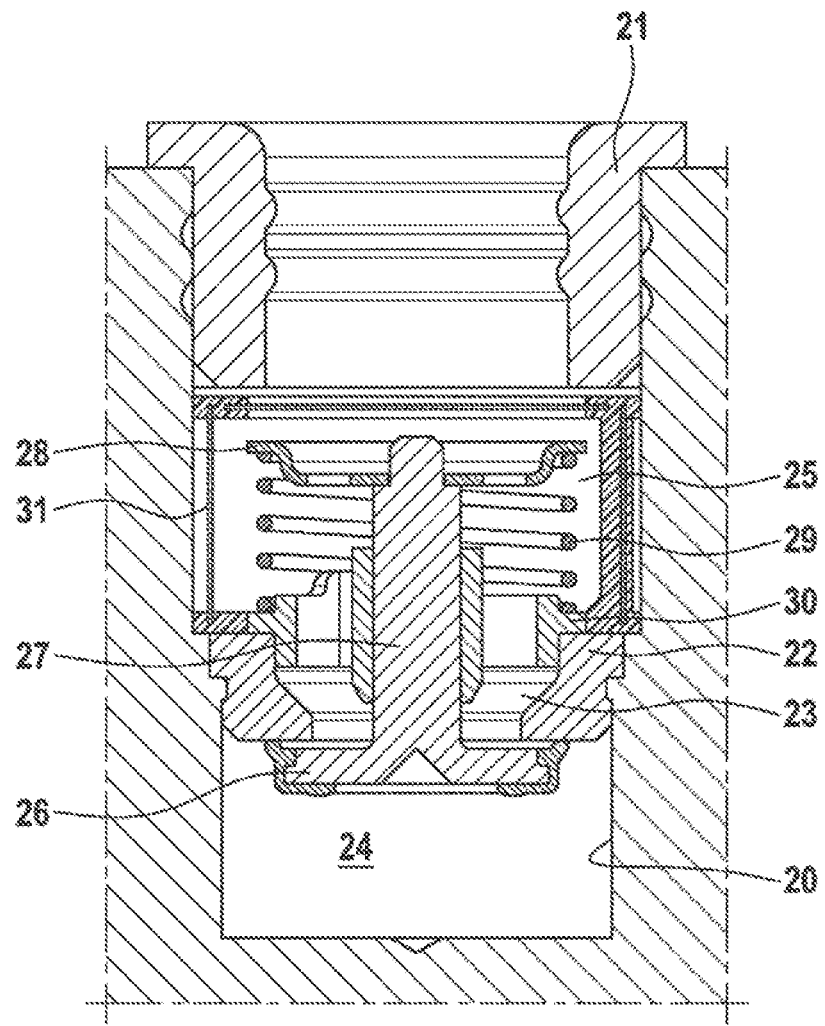
FIG. 2 shows a cross-sectional illustration of a check valve in the port to the reservoir.

The alternative embodiment as per FIG. 2 provides that the check valve 4 is arranged in the port 3. The port also consists of a blind bore 20 into which the check valve 4 is inserted in the form of a cartridge.

A ring plug 21 for receiving a pin (not illustrated) on the reservoir is situated in the mouth region of the blind bore 20. The ring plug 21 additionally has the task of holding the cartridge, if this is not already fixed in place in the blind bore 20, in the latter.

The check valve 4 will be described in more detail below on the basis of FIG. 2, wherein the check valve 4 as per FIG. 1 is of identical construction.

The check valve 4 consists of a valve ring 22 with a valve passage 23. The valve ring 22 is inserted into the blind bore 20 or 9 such that a bottom chamber 24 is formed above the valve ring 22 and above the bottom of the blind bore 20 and that an inflow chamber 25 is formed above the valve ring 22. Within the bottom chamber 24, there is situated a valve plate 26 which is able to be brought into sealing abutment with the underside, facing the bottom chamber 24, of the valve ring 22. A plunger 27 which is connected fixedly to the valve plate 26 projects through the valve passage 23 and has at its end remote from the valve plate 26 a plugged-on collar 28. A valve spring 29 is inserted between the collar 28 and the valve ring 22 and preloads the valve plate 26 against the valve ring 22.

Furthermore, on the rear side of the valve ring 22, there is situated a perforated guide plate 30 with a sleeve-like center in which the plunger 27 is guided.

A ring filter 31 is arranged above the valve ring 22 and is situated between the valve ring 22 and the ring plug 21.

| List of reference signs | |
|---|---|
| 1 | First block |
| 2 | Second block |
| 3 | Port |
| 4 | Check valve |
| 5 | Compression chamber |
| 6 | Bore |
| 7 | Boundary surface |
| 8 | Boundary surface |
| 9 | Blind bore |
| 10 | Duct |
| 11 | First duct section |
| 12 | Second duct section |
| 13 | First outer surface |
| 14 | Second outer surface |
| 15 | Port bore |
| 16 | Bottom duct |
| 20 | Blind bore |
| 21 | Ring plug |
| 22 | Valve ring |
| 23 | Valve passage |
| 24 | Bottom chamber |
| 25 | Inflow chamber |
| 26 | Valve plate |
| 27 | Plunger |
| 28 | Collar |
| 29 | Valve spring |
| 30 | Guide plate |
| 31 | Filter ring |

The invention claimed is:

1. A hydraulic control housing of modular construction, comprising:

one first block, which has a first boundary surface and has a port to a reservoir, at least one second block, which has a second boundary surface and in which a compression chamber is formed, wherein the blocks abut with their boundary surfaces against one another, and the compression chamber is connected to the port via a duct which crosses the boundary surfaces, wherein the duct is separate from the compression chamber and has a first duct section, which extends in the first block, and a second duct section, which extends in the second block, and having a check valve in the duct, which check valve opens in the direction of the compression chamber, wherein the check valve is arranged in the first duct section, and wherein the port is formed in a blind bore in which a cartridge with the check valve is inserted, wherein said cartridge is held against a step in the blind bore by a ring plug, which is suitable for receiving a pin of the reservoir.

2. The control housing as claimed in claim 1, wherein the first block has a first outer surface into which the blind bore opens, wherein the outer surface extends parallel to the boundary surface of the first block, in that the check valve is inserted into the blind bore in the form of the cartridge, and in that the first block has a second outer surface in which the port to the reservoir is situated.

3. The control housing as claimed in claim 2, wherein the first duct section is made up of a port duct and a bottom duct, wherein the port duct extends from a lateral surface of the blind bore to the port, and the bottom duct extends from the bottom of the blind bore into the boundary surface of the first block.

4. The control housing as claimed in claim 1, wherein the check valve is a plate valve which has a valve ring having a valve passage, the underside of which valve ring is directed toward the bottom of the blind bore, wherein a valve plate is situated in front of the underside and, for the purpose of closing off the valve passage, is able to be brought into abutment with the underside.

5. The control housing as claimed in claim 4, wherein the valve plate has a valve plunger which extends through the valve passage, wherein a cylindrical spring is supported at one side against the rear side of the valve ring and at the other side against a collar connected to the plunger.

6. The control housing as claimed in claim 5, wherein a filter ring is situated on the rear side of the valve ring and is held either by a closure cover or by the ring plug.

* * * * *